(12) United States Patent
Soga

(10) Patent No.: US 11,062,134 B2
(45) Date of Patent: Jul. 13, 2021

(54) APPARATUS FOR SETTING FILE NAME AND THE LIKE FOR SCAN IMAGE, CONTROL METHOD THEREOF, AND STORAGE MEDIUM

(71) Applicant: CANON KABUSHIKI KAISHA, Tokyo (JP)

(72) Inventor: Masaya Soga, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 102 days.

(21) Appl. No.: 16/103,692

(22) Filed: Aug. 14, 2018

(65) Prior Publication Data
US 2019/0065842 A1 Feb. 28, 2019

(30) Foreign Application Priority Data
Aug. 22, 2017 (JP) .............................. JP2017-159543

(51) Int. Cl.
*G06K 9/00* (2006.01)
*G06K 9/20* (2006.01)
*H04N 1/00* (2006.01)

(52) U.S. Cl.
CPC ....... *G06K 9/00469* (2013.01); *G06K 9/2081* (2013.01); *G06K 2209/01* (2013.01);
(Continued)

(58) Field of Classification Search
CPC ............. G06K 9/00469; G06K 9/2081; G06K 2209/01; H04N 1/00331; H04N 1/00461; H04N 1/00244; H04N 2201/0094
See application file for complete search history.

(56) References Cited

U.S. PATENT DOCUMENTS

2005/0210031 A1* 9/2005 Kasatani .............. H04N 1/0096
2008/0198860 A1* 8/2008 Jain ..................... H04L 12/4641
370/401

(Continued)

FOREIGN PATENT DOCUMENTS

JP 2015-215878 12/2015

OTHER PUBLICATIONS

U.S. Appl. No. 16/100,943, filed Aug. 10, 2018 Inventor: Daijiro Miyamoto.

(Continued)

*Primary Examiner* — Ming Y Hon
(74) *Attorney, Agent, or Firm* — Venable LLP

(57) ABSTRACT

In a situation of setting a file name and the like by using a character string obtained by performing OCR processing to a scan image, a file name and the like can be immediately set with less calculation resources. There is provided an apparatus for performing a predetermined process to a scan image obtained by scanning a document, including: a display control unit configured to display a UI screen for performing the predetermined process, the UI screen displaying a character area in the scan image in a selectable manner to a user; and a setting unit configured to perform OCR processing to a character area selected by a user via the UI screen and set supplementary information for the predetermined process by using a character string extracted in the OCR processing, wherein the setting unit, during a period of time before a user makes the selection, performs OCR processing in advance under a predetermined condition to a character area included in the scan image, in a case where the selected character area is a character area having undergone OCR processing in advance, uses a result of the OCR processing to set supplementary information for the predetermined process.

13 Claims, 13 Drawing Sheets

(52) U.S. Cl.
CPC ..... *H04N 1/00244* (2013.01); *H04N 1/00331* (2013.01); *H04N 1/00461* (2013.01); *H04N 2201/0094* (2013.01)

(56) References Cited

U.S. PATENT DOCUMENTS

| | | | | |
|---|---|---|---|---|
| 2008/0259384 A1* | 10/2008 | Ito | ................... | H04N 1/32502 358/1.15 |
| 2008/0301234 A1* | 12/2008 | Tonegawa | .......... | H04N 1/00331 709/206 |
| 2011/0085198 A1* | 4/2011 | Son | .................. | H04N 1/00334 358/1.15 |
| 2011/0286043 A1* | 11/2011 | Hagisawa | ............. | G06F 40/174 358/1.15 |
| 2014/0314338 A1* | 10/2014 | Hamel | .................. | G06K 9/344 382/321 |
| 2014/0351817 A1* | 11/2014 | Sawamura | ......... | H04N 1/00244 718/102 |
| 2015/0302277 A1* | 10/2015 | Suzuki | ................. | G06K 9/2081 382/229 |
| 2016/0147386 A1* | 5/2016 | Han | .................... | G06F 3/04842 715/838 |
| 2016/0259987 A1* | 9/2016 | Ohkawa | ................. | G06K 9/033 |
| 2019/0065451 A1* | 2/2019 | Miyamoto | ............ | G06F 40/166 |

OTHER PUBLICATIONS

U.S. Appl. No. 16/103,695, filed Aug. 14, 2018 Inventor: Yoshitaka Matsumoto.
U.S. Appl. No. 16/139,996, filed Sep. 24, 2018 Inventor: Ken Tokita.
U.S. Appl. No. 16/100,943, filed Aug. 10, 2018.
U.S. Appl. No. 16/103,695, filed Aug. 14, 2018.
U.S. Appl. No. 16/139,996, filed Sep. 24, 2018.

* cited by examiner

FIG.7A

Preview Screen

Quotation No. 210580232

QUOTATION

Kawasaki Sogo Kenkyusho Corporation

Yokohama Corporation

Postal code 321-0000
Kanagawa Prefecture,
Yokohama City 000-000
TEL:012-345-6789
FAX:012-345-6780

Contact person:
Taro YAMADA

[Back] [Next]

FIG.7B

Preview Screen 700
701
702
710 Quotation No.210580232
711 ←
713 +
714 −
712 →
721 Next

QUOTATION

Kawasaki Sogo Kenkyusho Corporation

Yokohama Corporation
Postal code 321-0000
Kanagawa Prefecture,
Yokohama City 000-000
TEL:012-345-6789
FAX:012-345-6780
Contact person:
Taro YAMADA 720 Back

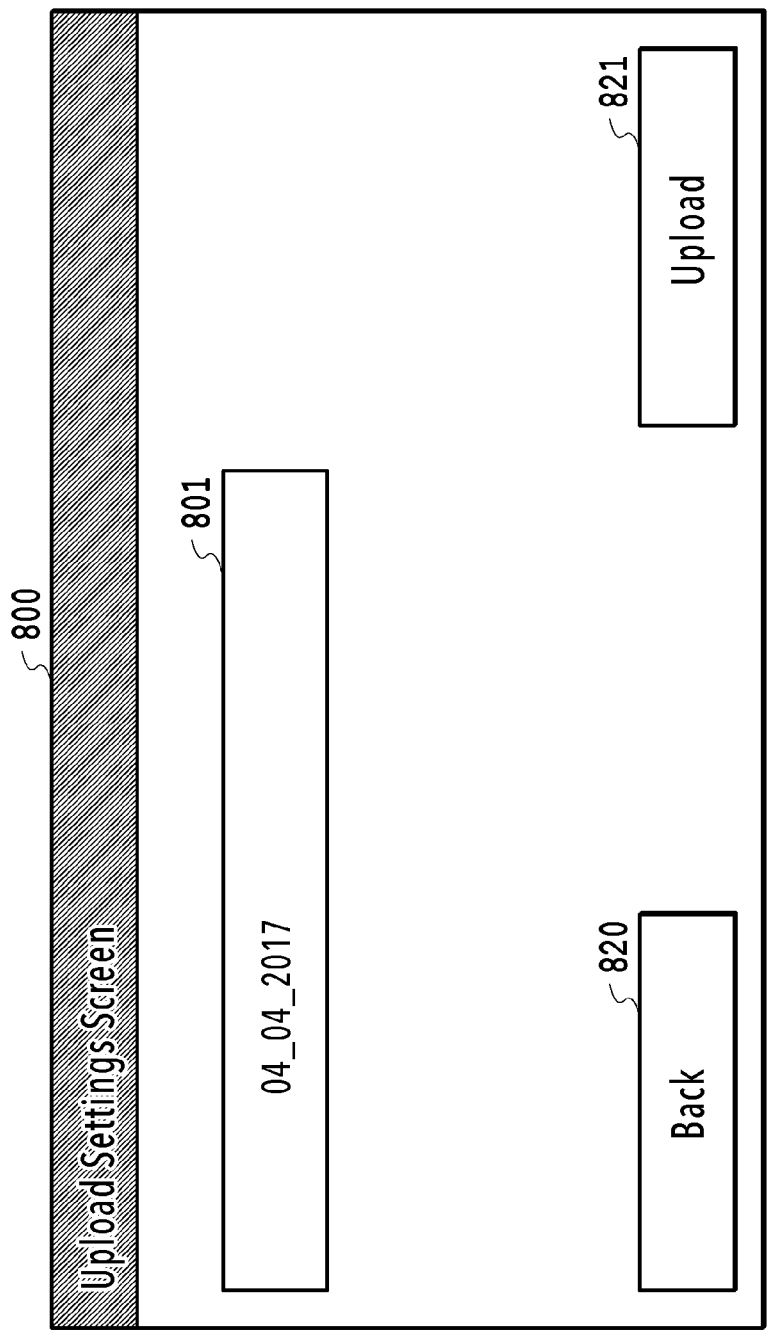

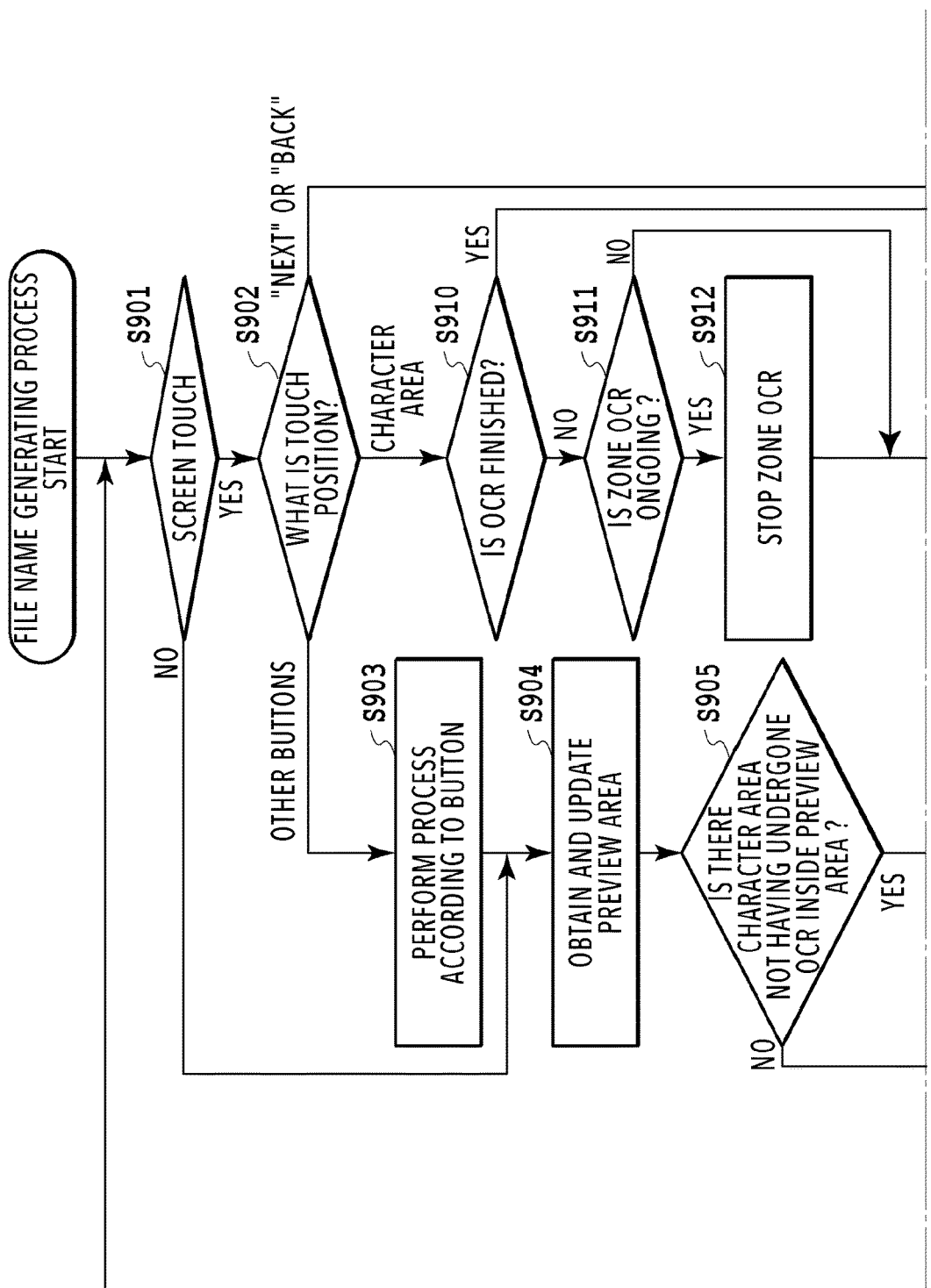

FIG.10A

Preview Screen

Quotation No.2105802232

QUOTATION

Kawasaki Sogo Kenkyusho Corporation

Yokohama Corporation
Postal code 321-0000
Kanagawa Prefecture,
Yokohama City 000-000
TEL:012-345-6789
FAX:012-345-6780
Contact person:
Taro YAMADA Back Next

FIG.10B

Preview Screen 700
701
702
710 Quotation No.2105802232
711 ←
713 +
714 −
712 →
721 Next

QUOTATION

Kawasaki Sogo Kenkyuusho Corporation

Yokohama Corporation
Postal code 321-0000
Kanagawa Prefecture,
Yokohama City 000-000
TEL:012-345-6789
FAX:012-345-6780
Contact person:
Taro YAMADA 720 Back

APPARATUS FOR SETTING FILE NAME AND THE LIKE FOR SCAN IMAGE, CONTROL METHOD THEREOF, AND STORAGE MEDIUM

BACKGROUND OF THE INVENTION

Field of the Invention

The present invention relates to a technique of using a character recognition result of a scan image and setting a file name and the like for the scan image.

Description of the Related Art

Traditionally, a method of scanning and digitizing a paper document has widely been used as a document managing method. Further, in digitizing a document, there is a technique of performing character recognition processing (OCR processing) to scanned image data and using recognized characters for a file name of a digitized document file. On this occasion, in a case of performing OCR processing to the entire scan image, a longer processing time and many calculation resources are required. In this respect, Japanese Patent Laid-Open No. 2015-215878, for example, discloses a technique of presenting a scan image obtained by scanning a document to a user to specify an area, performing OCR processing only on the specified area to obtain a character string, and using the character string for a file name of the scan image.

In the method disclosed in Japanese Patent Laid-Open No. 2015-215878, since OCR processing is performed only on a specified area in a scan image, the OCR processing requires less time as compared to the case of performing the OCR processing to the entire image. However, since an area is specified one by one and OCR processing is performed on the specified area individually, as the number of the areas of character strings used for a file name increases, a more time is required for a file name to be set.

The present invention has been made to solve the above problem, and an object of the present invention is to allow a file name and the like to be immediately set with less calculation resources in a situation of setting a file name and the like by using a character string obtained by performing OCR processing to a scan image.

SUMMARY OF THE INVENTION

According to the present invention, there is provided an apparatus for performing a predetermined process to a scan image obtained by scanning a document, including: a display control unit configured to display a UI screen for performing the predetermined process, the UI screen displaying a character area in the scan image in a selectable manner to a user; and a setting unit configured to perform OCR processing to a character area selected by a user via the UI screen and set supplementary information for the predetermined process by using a character string extracted in the OCR processing, wherein the setting unit, during a period of time before a user makes the selection, performs OCR processing in advance under a predetermined condition to a character area included in the scan image, and in a case where the selected character area is a character area having undergone OCR processing in advance, uses a result of the OCR processing to set supplementary information for the predetermined process.

Further features of the present invention will become apparent from the following description of exemplary embodiments with reference to the attached drawings.

BRIEF DESCRIPTION OF THE DRAWINGS

FIG. 7A and FIG. 7B show examples of a preview screen;

FIG. 8 shows an example of an upload screen;

FIG. 10A and FIG. 10B show examples of a result of performing zone OCR.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<Configuration of an Image Processing System>

Figure 1:
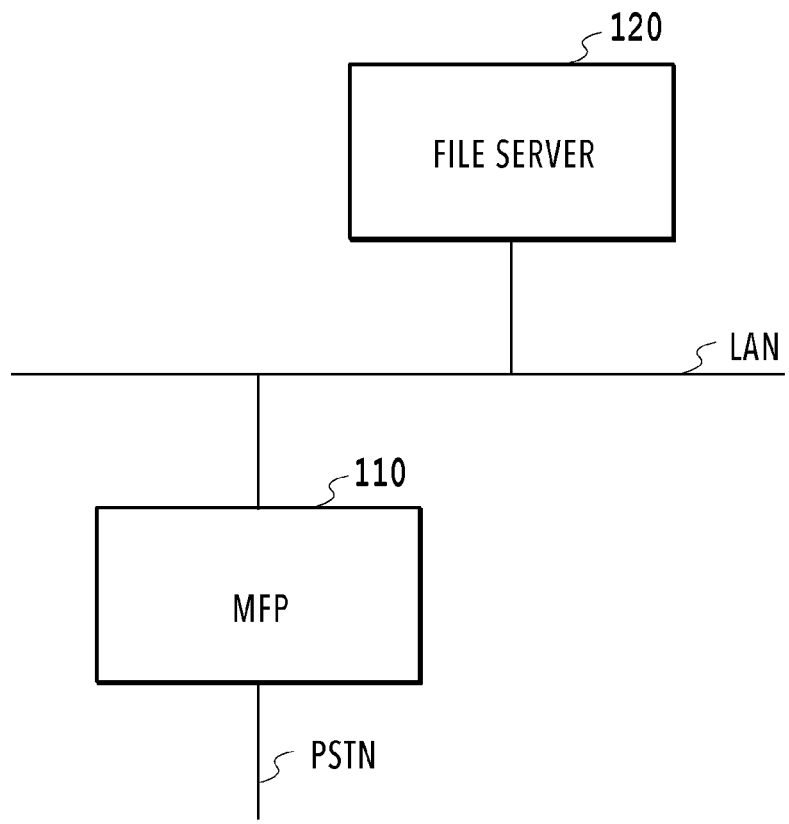
FIG. 1 is a diagram illustrating an entire configuration of an image processing system.

FIG. 1 is a diagram illustrating an entire configuration of an image processing system according to the present embodiment. The image processing system is composed of a MFP 110 and a file server 120, which are connected to each other via a LAN (Local Area Network) for communication.

The MFP (Multi Function Printer) 110 is multifunction equipment having a plurality of functions such as a scanner and a printer, and is an example of an image processing apparatus. The file server 120 is an example of an external server that stores and manages a digitized document file. The image processing system of the present embodiment is composed of the MFP 110 and the file server 120, but is not limited to this. For instance, the MFP 110 may also serve as the file server 120. Further, a connection form via, for example, the Internet, instead of the LAN, may be employed. Furthermore, the MFP 110 is connected to PSTN (Public Switched Telephone Networks) and can transmit and receive image data via facsimile to and from a facsimile machine (not shown).

Figure 2:
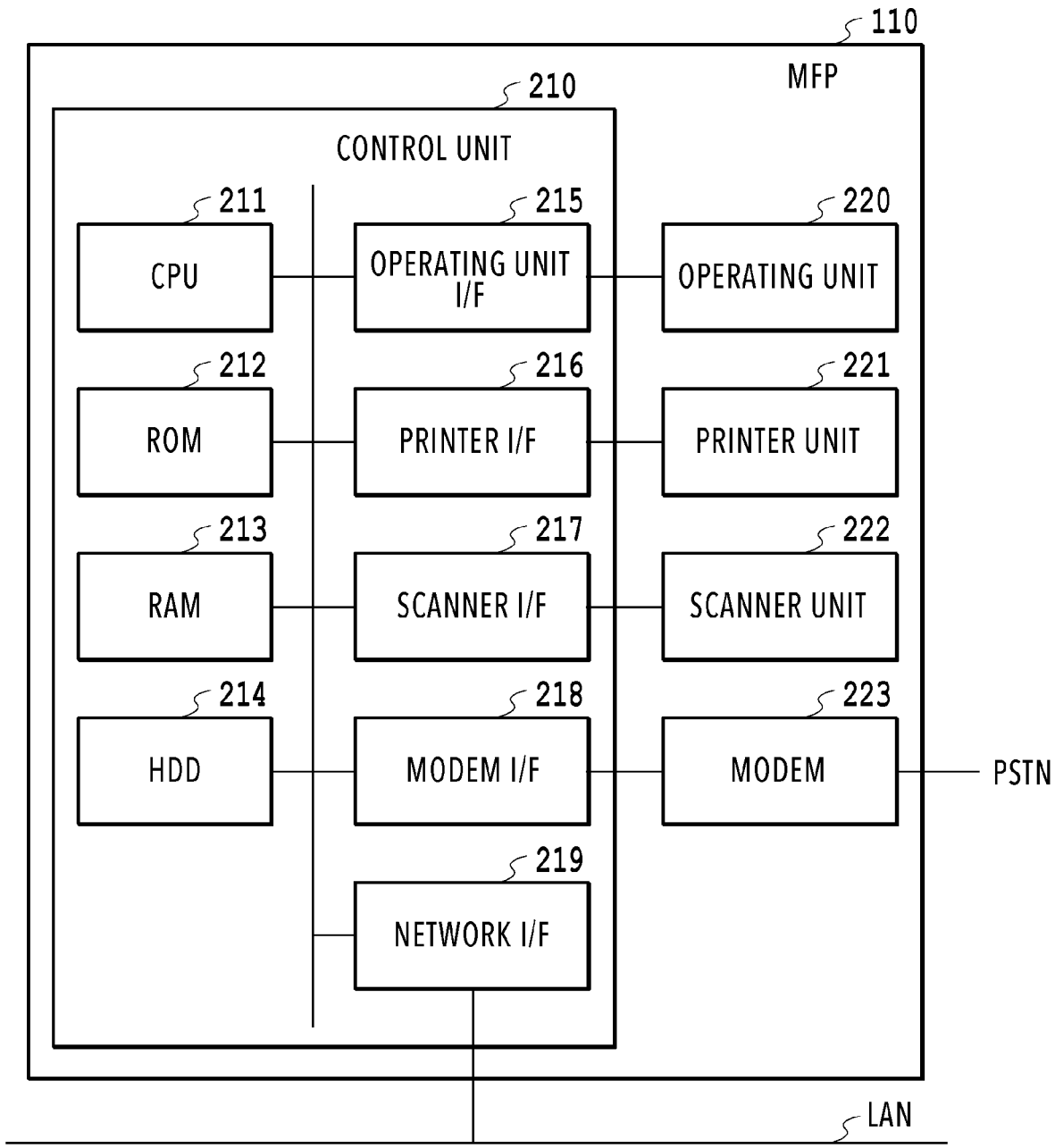
FIG. 2 is a diagram illustrating a hardware configuration of a MFP.

FIG. 2 is a diagram of a hardware configuration of the MFP 110. The MFP 110 is composed of a control unit 210, an operating unit 220, a printer unit 221, a scanner unit 222, and a modem 223. The control unit 210 is composed of the following units 211 to 219 to control the entire operation of the MFP 110. A CPU 211 loads a control program stored in a ROM 212 and executes and controls the various functions of the MFP 110 such as scanning, printing, and communication. A RAM 213 is used as a main memory of the CPU 211 or a temporary storage area such as a work area. It should be noted that in the present embodiment, one CPU 211 uses one memory (RAM 213 or HDD 214) to perform each process shown in the flowchart as will be described later, but the present invention is not limited to this. For example, a plurality of CPUs may perform processes with a plurality of RAMs or HDDs working together. The HDD 214 is a large capacity storage unit for storing image data and various programs. An operating unit I/F 215 is an interface connecting the operating unit 220 and the control unit 210. The operating unit 220 has a touch panel, a keyboard, and the like and receives an operation, input, and instruction by a user. A printer I/F 216 is an interface connecting the printer unit 221 and the control unit 210. Image data for printing is transferred from the control unit 210 to the printer unit 221 via the printer I/F 216 and printed on a print medium. A scanner I/F 217 is an interface connecting the scanner unit 222 and the control unit 210. The scanner unit 222 scans a document set on a platen or ADF (Auto Document Feeder) (not shown) to generate image data and inputs to the control unit 210 via the scanner I/F 217. The MFP 110 can not only print output (copy) the image data generated by the scanner unit 222 from the printer unit 221 but also transmit a file of the image data or transmit the image data via email. A modem I/F 218 is an interface connecting the modem 223 and the control unit 210. The modem 223 transmits and receives image data via facsimile to and from a facsimile machine over PSTN. A network I/F 219 is an interface connecting the control unit 210 (the MFP 110) to the LAN. The MFP 110 transmits image data and information and receives various types of information to and from an external apparatus (e.g., the file server 120) on the LAN by using the network I/F 219.

Figure 3:
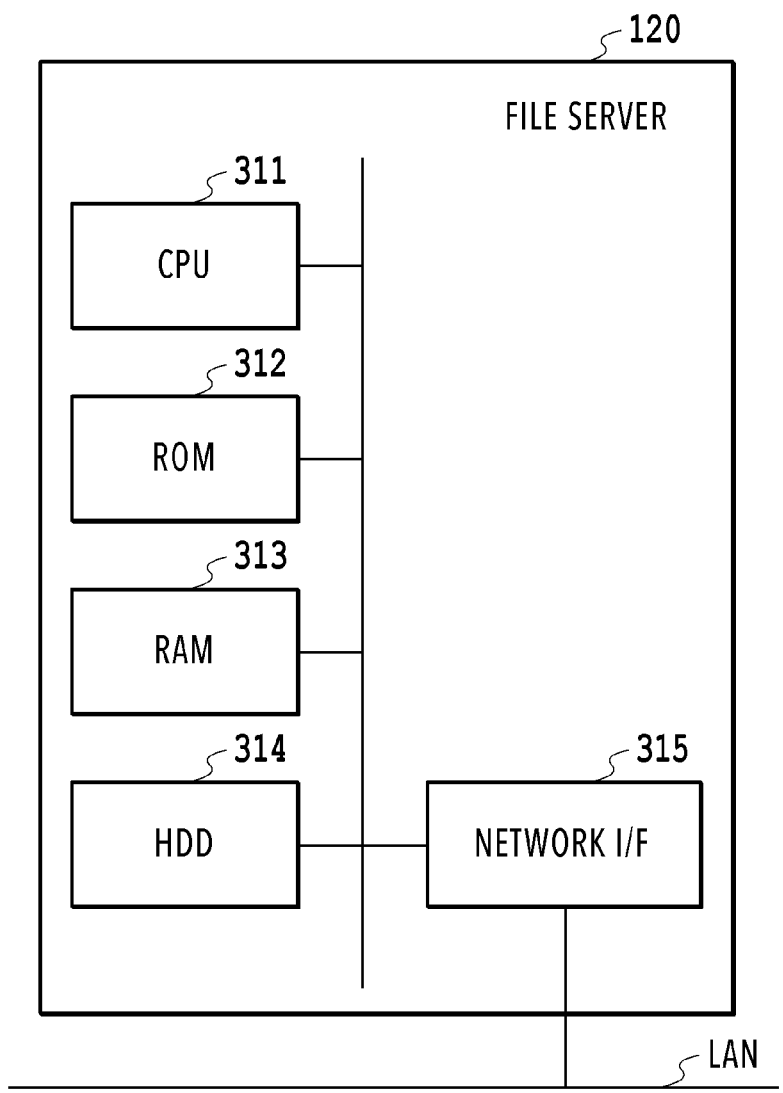
FIG. 3 is a diagram illustrating a hardware configuration of a file server.

FIG. 3 is a diagram of a hardware configuration of the file server 120. The file server 120 is composed of a CPU 311, a ROM 312, a RAM 313, a HDD 314, and a network I/F 315. The CPU 311 loads control programs stored in the ROM 312 and performs various processes to control the entire operation of the file server 120. The RAM 313 is used as a main memory of the CPU 311 or a temporary storage area such as a work area. The HDD 314 is a large capacity storage unit for storing image data and various programs. The network I/F 315 is an interface connecting the file server 120 to the LAN. The file server 120 transmits and receives various types of information to and from other apparatuses (e.g., the MFP 110) on the LAN by using the network I/F 315.

<Software Configuration of the MFP>

Figure 4:
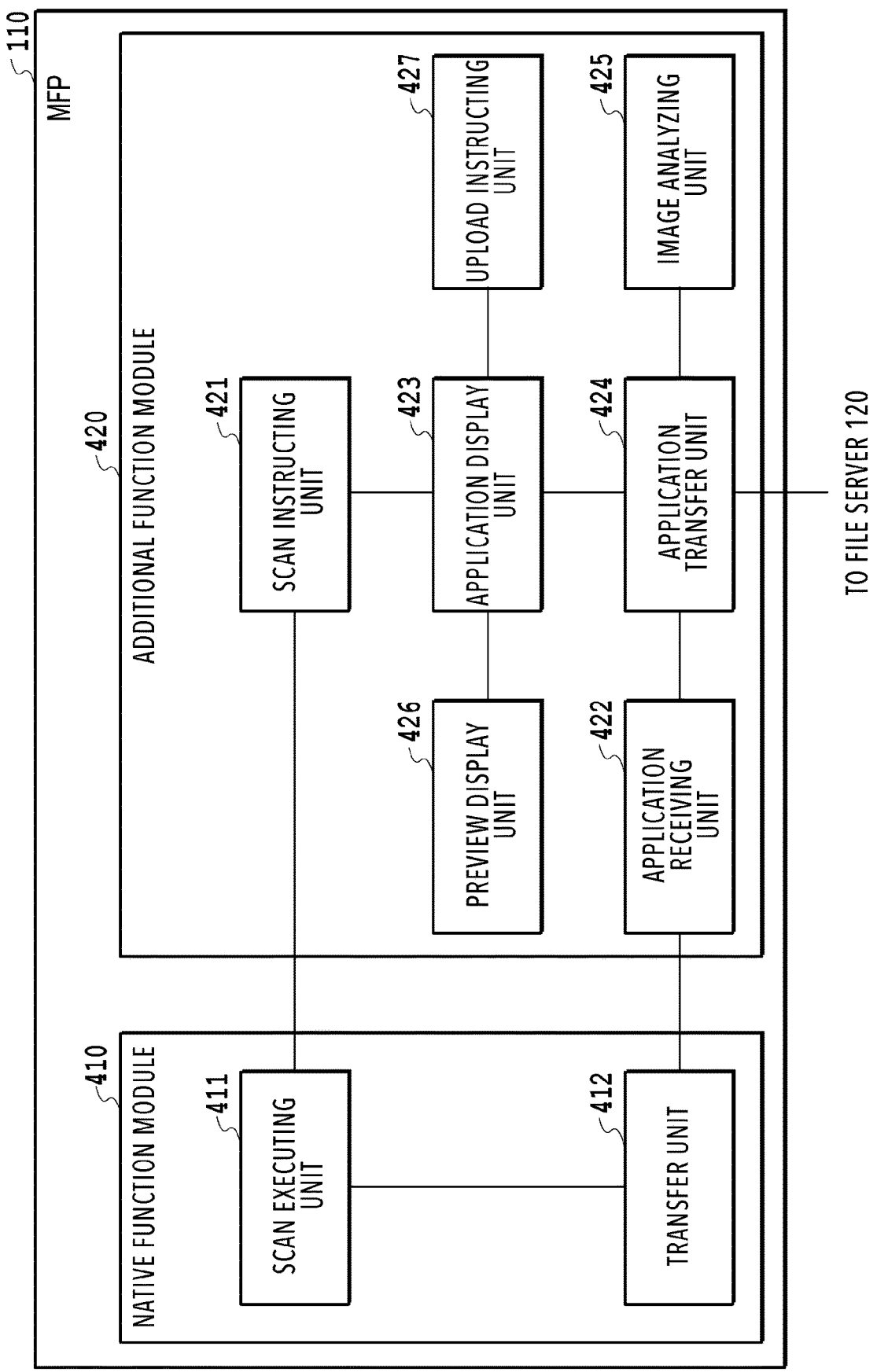
FIG. 4 is a diagram illustrating a software configuration of the MFP.

FIG. 4 is a diagram of a software configuration of the MFP 110. Software of the MFP 110 is roughly divided into two: a native function module 410 and an additional function module 420. Units included in the native function module 410 are function modules basically provided in the MFP 110. Meanwhile, units included in the additional function module 420 are function modules additionally provided in the MFP 110, such as a function module realized by installation of an application. The additional function module 420 of the present embodiment is a Java (registered trademark) based application and can easily realize addition of functions to the MFP 110. Incidentally, other applications (not shown) may be installed in the MFP 110. The units forming both function modules 410 and 420 will be described below.

An application display unit 423 performs display control to display a UI screen for receiving various types of operation by a user on a touch panel of the operating unit 220. The UI screen to be displayed will be described later in detail. A scan instructing unit 421 transmits a scan request including scan setting information and transfer setting information to a scan executing unit 411 in response to a user instruction inputted via the UI screen and causes the scan executing unit 411 to perform a scan process. The scan request also includes a request ID for identifying whether image data received by an application receiving unit 422, which will be described later, corresponds to the scan request.

If the scan request is received from the scan instructing unit 421, the scan executing unit 411 controls the scanner unit 222 via the scanner I/F 217 to perform the scan process. Accordingly, a document is scanned and image data is generated. The image data generated by scanning (hereinafter referred to as "scan image data") is passed to a transfer unit 412 together with the transfer setting information that specifies a destination of the image data. The transfer unit 412 transfers the scan image data received from the scan executing unit 411 according to the transfer settings. For the destination of the scan image data, the file server 120, a PC (not shown) on the LAN, or the like can be set. However, in the present embodiment, all of the scan image data generated by the scan executing unit 411 is supposed to be once transferred to the additional function module 420. The transfer unit 412 has a FTP (File Transfer Protocol) client function and transfers the scan image data by using a FTP to the application receiving unit 422 having a FTP server function.

The application receiving unit 422 receives the scan image data internally transferred from the transfer unit 412 and passes it to an application transfer unit 424. The application transfer unit 424 passes the received scan image data to an image analyzing unit 425. The image analyzing unit 425 performs an image analysis process to the received scan image data, such as specifying a character area and character recognition. Then, the scan image data and its analysis result are passed to a preview display unit 426 via the application transfer unit 424. Based on the scan image data and its analysis result, the preview display unit 426 generates a UI screen for a user to set a file name and performs display control such as displaying on a liquid crystal panel of the operating unit 220.

An upload instructing unit 427 generates a UI screen for a user to set a folder path and displays it on the touch panel of the operating unit 220. The application transfer unit 424 transfers (transmits) the scan image data to the file server 120. If the transfer is finished, the application transfer unit 424 notifies the application display unit 423 that the transfer has been finished. If the notification is received from the application transfer unit 424, the application display unit 423 updates a display content. Further, the application transfer unit 424 has a SMB (Server Message Block) client function. Accordingly, file operation and folder operation are performed with respect to the file server 120 having a SMB server function by using a SMB. It should be noted that a protocol to be used is not limited to the SMB. WebDAV, FTP, SMTP, or the like may be used. Furthermore, a protocol other than the protocol used for the purpose of file transmission such as SOAP or REST may be used.

Figure 5:
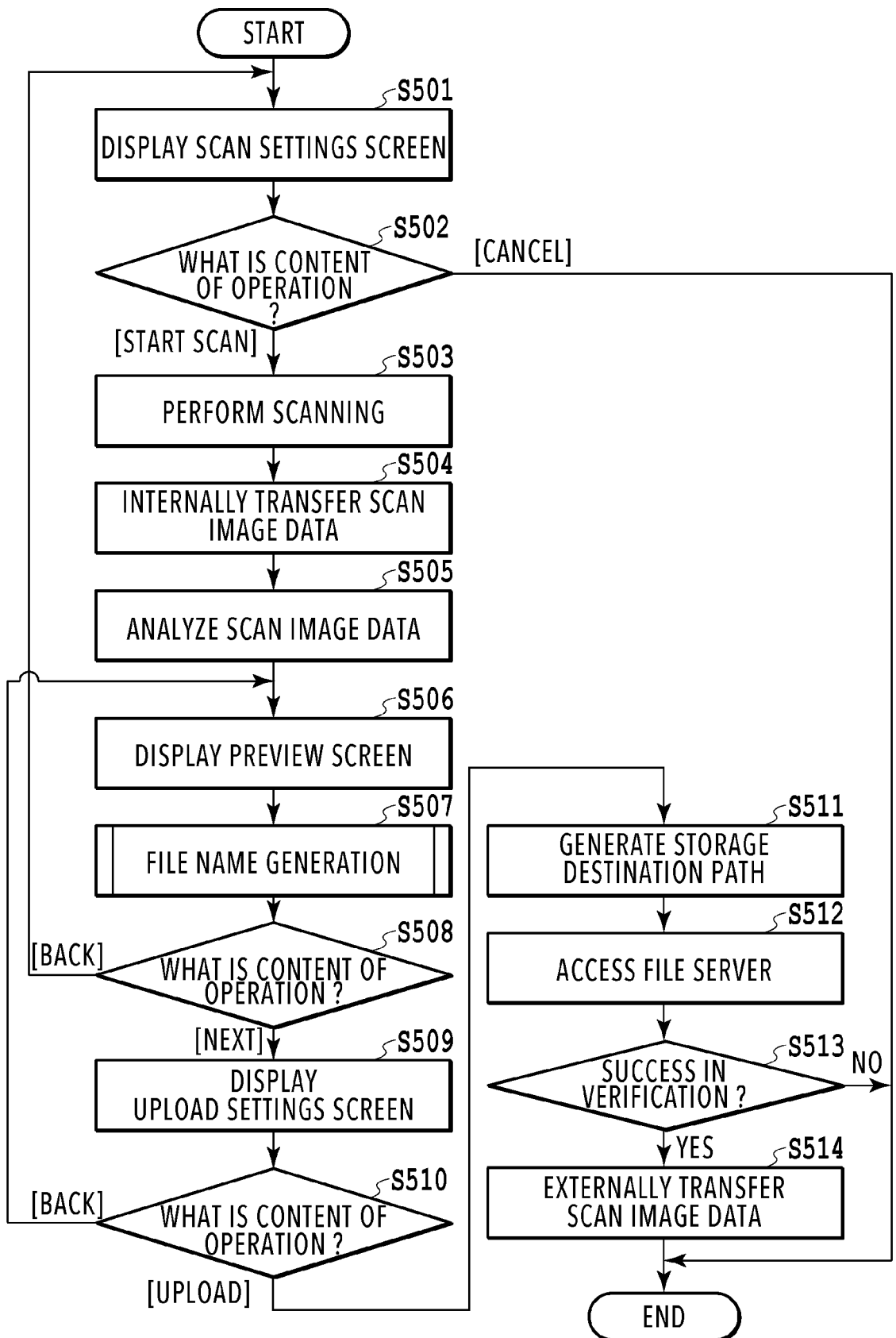
FIG. 5 is a flowchart illustrating a flow of operation control from generation to upload of a scan image.

Next, operation control in the MFP 110 in generating a scan image from a document and uploading it to the file server 120 will be described. FIG. 5 is a flowchart showing a flow of control from generation to upload of a scan image. The series of processes can be realized by the CPU 211 executing control programs stored in the HDD 214 in the control unit 210. Detailed description will be given below.

Figure 6:
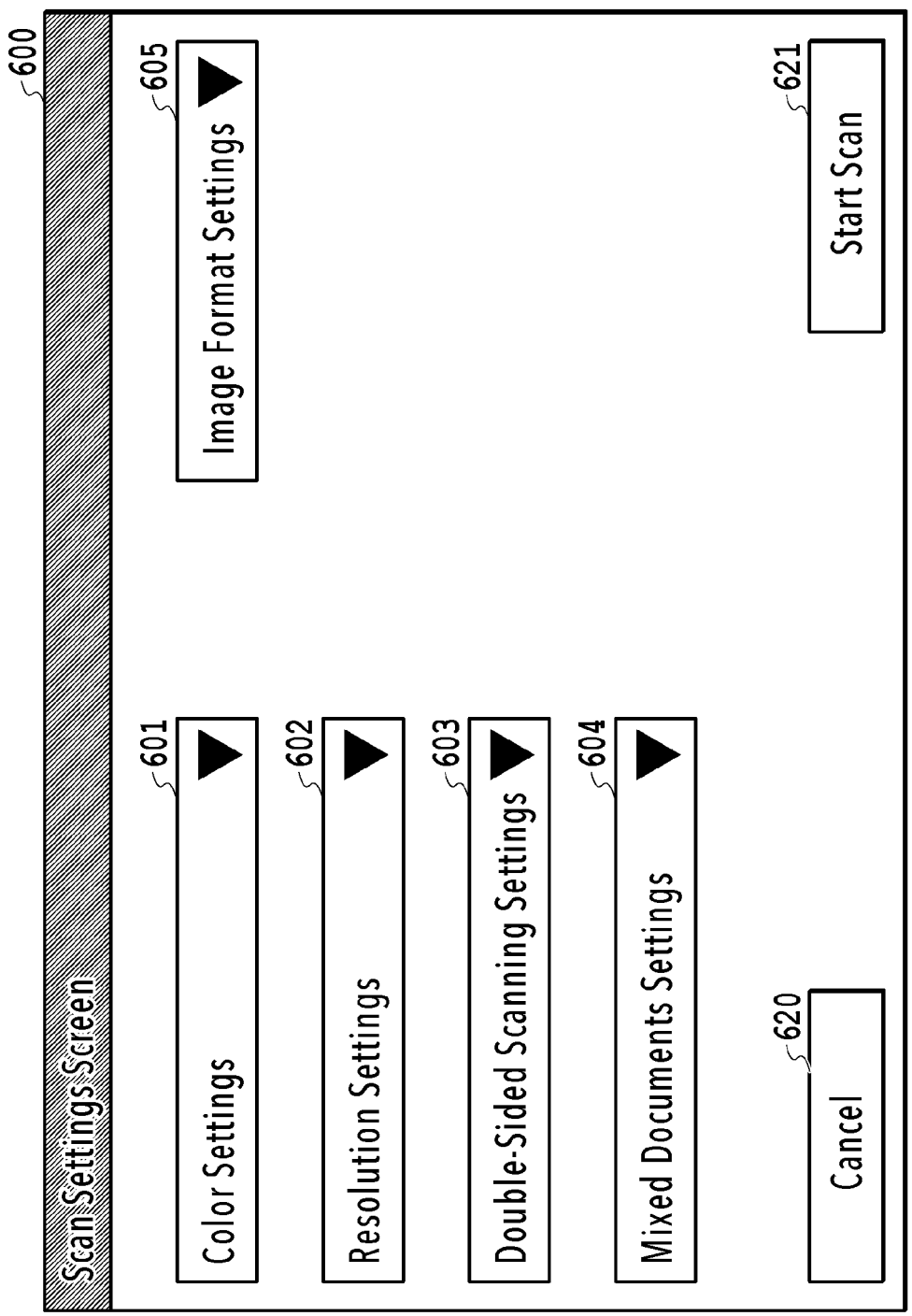
FIG. 6 shows an example of a scan settings screen.

In step 501, a UI screen (hereinafter referred to as a "scan settings screen") for making various settings for a scan process is displayed by the application display unit 423 on the touch panel of the operating unit 220. FIG. 6 shows an example of a scan settings screen. A scan settings screen 600 of FIG. 6 has five settings buttons 601 to 605. A [Color Settings] button 601 is a button for setting color/monochrome in scanning a document. A [Resolution Settings] button 602 is a button for setting a resolution in scanning a document. A [Double-Sided Scanning Settings] button 603 is a settings button used in need of scanning two sides of a document. A [Mixed Documents Settings] button 604 is a settings button used in need of scanning documents in different sizes at one time. An [Image Format Settings] button 605 is a settings button used in specifying a saving format of scan image data. In making settings using these settings buttons 601 to 605, candidates (options) that can be set within a range supported in the MFP 110 are displayed, and a user selects desired settings from the displayed candidates. It should be noted that the above settings buttons are described as examples. Not all of these setting items should be included, and setting items other than these setting items may be included. The user makes detailed settings relating to the scan process via the scan settings screen 600. A [Cancel] button 620 is a button used in stopping scan settings. A [Start Scan] button 621 is a button for instructing start of a scan process with respect to a document set on a platen or the like.

In step 502, by the application display unit 423, processes are separated according to the contents of button operation by the user. In a case where pressing of the [Start Scan] button 621 is detected, the contents set by the settings buttons 601 to 605 and the receipt of starting the scan process are notified to the scan instructing unit 421 by the application display unit 423. Meanwhile, in a case where pressing of the [Cancel] button 620 is detected, the present process is finished.

In step 503, in response to an instruction from the scan instructing unit 421, the scan process is performed by the scan executing unit 411. In step 504, the thus obtained scan image data is internally transferred using the FTP to the application receiving unit 422 through the transfer unit 412, and further transmitted to the image analyzing unit 425 via the application transfer unit 424.

In step 505, in the image analyzing unit 425, an analysis process for the scan image data is performed. More specifically, first, with respect to the scan image data, binarization of image signals, correction of inclination of the document displaced in scanning, turning of the document in a positionally-correct direction, and the like are performed to correct the state of the scan image data so that the analysis process is smoothly performed. Then, edge extraction or the like is performed to the corrected scan image (binary image) to specify a character area in the image, that is, a block (unit area) assumed to be one continuous character string. Table 1 below shows an example of results of an image analysis process performed to a portion of a scan image of a given quotation.

TABLE 1

| No. | X Coordinate of Area | Y Coordinate of Area | Area Width | Area Height |
| --- | --- | --- | --- | --- |
| 1 | 5 | 30 | 25 | 7 |
| 2 | 40 | 30 | 70 | 7 |
| 3 | 115 | 30 | 25 | 7 |
| 4 | 5 | 40 | 30 | 7 |
| 5 | 40 | 40 | 40 | 7 |
| 6 | 100 | 40 | 10 | 7 |
| 7 | 5 | 50 | 30 | 7 |
| 8 | 40 | 50 | 37 | 7 |

In the above Table 1, [No.] indicates a unique number of each specified character area. In this example, serial numbers 1 to 8 are put in order of recognition. [X Coordinate of Area] indicates the X coordinate of the upper left corner of each specified character area. [Y Coordinate of Area] indicates the Y coordinate of the upper left corner of each specified character area. Hereinafter, in using the term "coordinate(s)" for a character area, the term refers to position coordinates of the upper left corner of a character area unless otherwise specified. [Area Width] indicates a distance between the left side and the right side of each specified character area. [Area Height] indicates a distance between the upper side and the lower side of each specified character area. In the present embodiment, [X Coordinate of Area], [Y Coordinate of Area], [Area Width], and [Area Height] are all represented by pixels, but they may also be represented by points, inches, or the like. Information on each character area extracted from the scan image (hereinafter referred to as "character area information") is passed to the application transfer unit 424 as image analysis data. The image analysis data is in a CSV or XML format, for example, but may be in other formats. Further, the image analysis data may be passed at a predetermined timing after temporarily stored in the HDD 214.

In step 506, the scan image obtained in step 503 is preview displayed by the preview display unit 426 on the touch panel of the operating unit 220. Screen data for the preview display is generated and provided by the application display unit 423. The user can set a file name of the scan image data via the UI screen (hereinafter referred to as a "preview screen") in which a scan image is preview displayed. FIG. 7A shows an example of a preview screen. In a preview screen 700, the obtained scan image is displayed in a preview area 710 located in the center of the screen. Further, in the preview area 710, together with the scan image, a plurality of buttons 711 to 714 are also displayed for changing a display state of the scan image. The buttons 711 and 712 appear when the entire scan image cannot be displayed and are used for scrolling the display area in a vertical direction. Usually, the size of the touch panel provided in the MFP 110 is not that large. Accordingly, for example, in a case where the scan image is obtained by scanning a document in A4-size, portrait, with horizontal writing, an initial setting is made so that the scan image is top-aligned, scaled-down, and displayed with its entire width direction (lateral direction) just fitted into the preview area 710. That is, in the initial setting, a lower part of the A4-size, portrait scan image is not displayed within the preview area 710. In this case, by pressing the "↓" button 712, the display area is scrolled down and the lower part can be displayed. Furthermore, in a case where the scan image is A4-size landscape, A3-size, or the like, a button for scrolling the display area in a horizontal direction may further be provided. The buttons 713 and 714 are buttons for the scaling of the display area. Pressing the "+" button 713 allows zooming in, and pressing the "−" button 714 allows zooming out. Actions by the button operation may be realized by operation with user's fingers, such as swipe, pinch in/pinch out on the preview screen. In the preview area 710, a character area specified in the image analysis process in step 505 is displayed in a recognizable manner to the user based on the above-described character area information. FIG. 7B shows a state where each character area is displayed in a recognizable manner by a box in the preview screen 700 shown in FIG. 7A, and character areas correspond to the serial numbers 1 to 8 in the above Table 1. If the user selects (e.g., touches with a finger) any character area from the character areas displayed in the preview area 710, a character string included in the character area is displayed, that is, automatically inputted, in a file name input field 701 and becomes part of character strings forming a file name. Actions by the button operation may be realized by operation with user's fingers, such as swipe, pinch in/pinch out on the preview screen. A [Back] button 720 is a button used in stopping preview display. A [Next] button 721 is a button for moving to a screen in which an upload destination of the obtained scan image data is set. It should be noted that the above types of various buttons and aspects of display and selection of character areas are described as examples, and they are not limited to these examples. For instance, there may be buttons for correcting and changing character strings displayed in the file name input field 701 or for confirming a file name.

In step 507, a file name for the obtained scan image is generated by the preview display unit 426. Details of the file name generating process will be described later. After a desired file name is generated and the user presses the [Next] button 721, the process advances to step 508.

In step 508, like step 502, by the preview display unit 426, processes are separated according to the contents of button operation by the user. In a case where pressing of the [Next] button 721 is detected, information on a file name (a character string set as a file name) being displayed in the file name input field 701 is transmitted to the upload instructing unit 427, and the process advances to step 509. Meanwhile, in a case where pressing of the [Back] button 720 is detected, the process goes back to step 501 (display in the scan settings screen).

In step 509, a UI screen (hereinafter referred to as an "upload settings screen") for setting a transfer destination of the scan image data is displayed by the upload instructing unit 427 on the touch panel of the operating unit 220. The user makes detailed settings relating to upload to the file server 120 via the upload settings screen. FIG. 8 shows an example of the upload settings screen. The user inputs, to a folder path input field 801, a name of a folder path (a path name) in external transfer to the file server 120. In the example of FIG. 8, "04_04_2017" is inputted as a path name. An example of the inputting method is a method for displaying a subwindow (not shown) of a keyboard screen in response to tapping on the folder path input field 801 and prompting the user to input a path name via the keyboard screen. Alternatively, a path name may be selected and set from an address book stored in the HDD 214. A [Back] button 820 is a button used in stopping detailed settings relating to upload. An [Upload] button 821 is a button for instructing upload to the folder path that is set in the folder path input field 801.

In step 510, like step 508, by the upload instructing unit 427, processes are separated according to the contents of button operation by the user. In a case where pressing of the [Upload] button 821 is detected, the process advances to step 511. At this time, a path name inputted to the folder path input field 801, a file name generated in step 507, and various types of information on file server settings are passed to the application transfer unit 424. Incidentally, the file server settings are necessary information for storing scan image data in the file server 120 and specifically include information such as a host name, a starting point of a folder path, and a user name and a password for login. Meanwhile, in a case where pressing of the [Back] button 820 is detected, the process goes back to step 506 (display in the preview screen).

In step 511, a storage destination path for the scan image data is generated by the application transfer unit 424 based on the information received from the upload instructing unit 427. More specifically, a storage destination path is generated by adding a folder path to the file server settings (a host name of the file server 120, a starting point of the folder path). Accordingly, a storage destination path, for example, "¥¥server01¥Share¥04_04_2017" is generated. Then, in step 512, access to the file server 120 is performed by the application transfer unit 424. At this time, a user name and a password included in the file server settings are transmitted to the file server 120. In the file server 120 that has received the user name and the password, a verification process is performed.

In step 513, by the application transfer unit 424, processes are separated according to the verification result in the file server 120. That is, in a case where a notification of success in verification is received from the file server 120, the process advances to step 514. Meanwhile, in a case where a notification of failure in verification is received, the present process is finished.

In step 514, the scan image data is externally transferred by the application transfer unit 424 to a folder indicated by the storage destination path generated in step 511 and stored in the file server 120.

The above description is the content of operation control from generation to upload of a scan image according to the present embodiment. It should be noted that in the present embodiment, it is assumed that the processes in step 505 and step 506 are performed to the image data corresponding to one page generated by scanning. For instance, a button for performing image analysis on the next page may be provided in the preview screen 700, and the next page obtained by the analysis may be preview displayed, so that character strings forming a file name can be set from character areas in the following pages.

<File Name Generation>

Figure 9B:
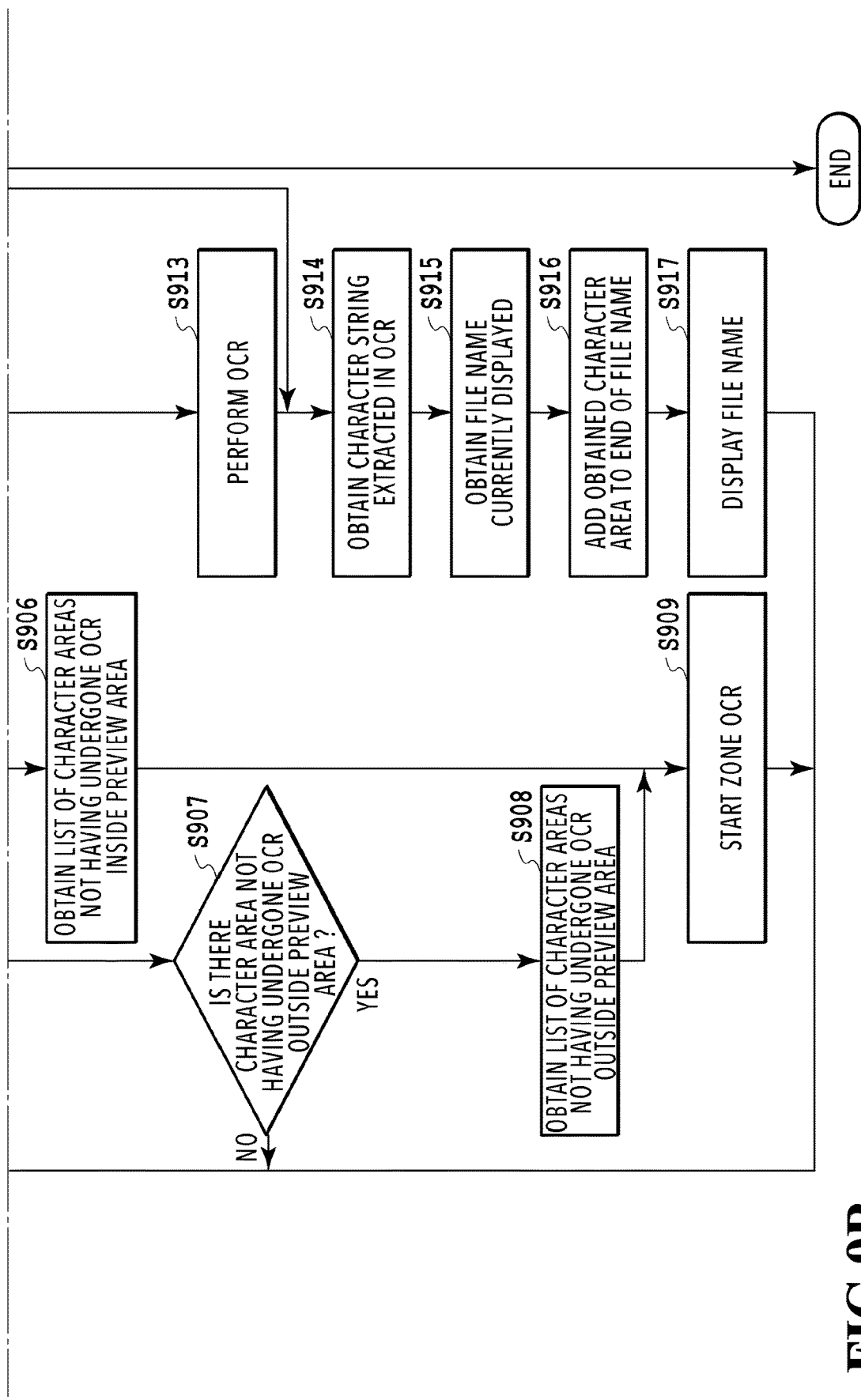
FIG. 9 is a diagram showing a relationship between FIGS. 9A and 9B, and FIGS. 9A and 9B are flowcharts illustrating details of a file name generating process.

FIGS. 9A and 9B are flowcharts illustrating details of the file name generating process (step 507) in the preview display unit 426. In this flow, OCR processing is performed on character areas within a preview displayed area one by one, and character strings are extracted. Then, if a user touches a desired character area while OCR processing is sequentially performed to character areas, an OCR result of the touched character area (recognized character string) is displayed in the file name input field 701. At this time, if OCR processing has already been performed to the touched character area and a character string has already been extracted, the recognized character string as extracted is immediately displayed. Hereinafter, detailed description will be given in accordance with the flow of FIGS. 9A and 9B.

In step 901, presence or absence of touch operation by the user on the preview screen 700 displayed on the touch panel is monitored. If touch operation is detected, the process advances to step 902. Meanwhile, if touch operation is not detected, the process advances to step 904.

In step 902, processes are separated according to a touch position. In a case where a touch position is the [Next] button 721 or the [Back] button 720, the present process is finished. In a case where a touch position is in one of character areas displayed in the preview area 710, the process advances to step 910. In a case where a touch position is another button, the process advances to step 903.

In step 903, a process is performed according to a button in the touch position. For instance, if a touch position is the "↓" button 712, the display area is scrolled in a downward direction, and if a touch position is the "−" button 714, the display area is zoomed out. The processes in the following step 904 to step 909 are performed by the image analyzing unit 425 based on instructions from the preview display unit 426.

In step 904, information on the display area in the current region of the preview area 710 (the current preview region) is obtained and updated if necessary. That is, in a case where execution of batch OCR processing is already started in step 909 (described later), a character area having undergone OCR processing at this point is highlighted (shaded, changed in frame or color, etc.) or the like to change a display form so that the character area having undergone OCR processing can be distinguished from a character area not having undergone OCR processing. Furthermore, in a case where processing such as scrolling or scaling of the display area is performed in step 903, the display form of the character area is changed based on the display area within the current preview region after the process. Incidentally, if there is no operation by a user, information on the display area according to the above-described initial setting (for example, in a case where the scan image is obtained by scanning a document in A4-size, portrait, with horizontal writing, the scan image is top-aligned and displayed with its entire width direction fitted into the current preview region) is obtained as information on the current preview region.

In step 905, it is determined whether the current preview region includes a character area not having undergone OCR processing. In a case where there is a character area not having undergone OCR processing inside the current preview region, the process advances to step 906, and information on character areas not having undergone OCR processing (hereinafter referred to as an "OCR pending list") out of the character areas included in the current preview region is obtained. At this time, a character area extending over the inside and the outside (boundary) of the current preview region is also a target if it has not undergone OCR processing. Incidentally, the current preview region may have a certain margin. That is, a peripheral region of the current preview region may be handled as the "current preview region." At this time, it is appropriately determined what area including a part having what distance from the current preview region should be handled as an area equivalent to the "current preview region" in consideration of a resolution of the touch panel, calculation resources, a use case, and the like. For instance, in a case where the resolution of the touch panel is VGA (640×480), a region including the top, bottom, left, right parts extending outward the current preview region, corresponding to 100 pixels at the maximum, may be handled as the "current preview region." In this case, even if a user scrolls the preview display area to some extent, since character areas around the current preview region have undergone OCR processing, character strings are supposed to immediately appear in the file name input field 701. In this manner, a method for giving a margin to the current preview region is effective, for example, in a case where the preview is magnified or the touch panel itself is small. As a result of determination, if there is no character area not having undergone OCR processing inside the current preview region, the process advances to step 907.

In step 907, it is determined whether there is a character area not having undergone OCR processing outside the current preview region. In a case where there is a character area not having undergone OCR processing outside the current preview region, the process advances to step 908, and information on character areas not having undergone OCR processing (OCR pending list) out of the character areas outside the current preview region is obtained. Meanwhile, in a case where there is no character area not having undergone OCR processing, the process goes back to step 901.

In step 909, execution of batch OCR processing (hereinafter referred to as "zone OCR") is started to a predetermined character area in the OCR pending list obtained in step 906 or step 908. The predetermined character area in this example is determined under preset conditions based on, for example, position coordinates or a size of a character area. Examples of the conditions based on position coordinates of a character area include placing a character area having a smaller Y coordinate at a first priority, placing a character area having a smaller X coordinate at a second priority, and determining top three character areas as targets for zone OCR. Examples of the conditions based on a size of a character area include placing a character area having a greater size at a higher priority and determining top three character areas as targets for zone OCR. Like the examples given above, conditions for determining targets for zone OCR are determined by a user or a manager in consideration of calculation resources or the like. FIG. 10A and FIG. 10B show examples of a result of performing zone OCR under above-described conditions based on position coordinates in the preview screen 700 shown in FIG. 7B. FIG. 10A shows a state at a point when first zone OCR is completed, where three character areas having undergone OCR processing ("Quotation No. 210580232," "Quotation," "Kawasaki Sogo Kenkyusho Corporation") are shaded and displayed. FIG. 10B shows a state at a point when second zone OCR is completed, where three more character areas ("Yokohama Corporation," "Postal code 321-0000," "Kanagawa Prefecture, Yokohama City 000-000") are shaded and displayed. Once the zone OCR is started, the process goes back to step 901.

In step 910 in a case where touch operation on any one of character areas displayed in the preview area 710 is detected, it is determined whether OCR processing on a character area relating to the touch operation has already been finished. As a result of determination, in a case where OCR processing has already been finished, the process advances to step 914. Meanwhile, in a case where OCR processing has not been finished, the process advances to step 911.

In step 911, it is determined whether the above-described zone OCR is ongoing. If the zone OCR is ongoing, the process advances to step 913 after the zone OCR is stopped in step 912, and OCR processing on the character area relating to the touch operation is performed. Meanwhile, if the zone OCR is not ongoing, the process immediately advances to step 913, and OCR processing on the character area relating to the touch operation is performed.

In step 914, regarding the character area relating to the touch operation, a character string newly extracted in step 913 or a character string already extracted in the zone OCR is obtained. As stated above, in a case where a user performs touch operation on a desired character area while the zone OCR is ongoing, the zone OCR is stopped, and OCR processing is performed on a character area selected by the user with a higher priority.

In step 915, a file name currently displayed in the file name input field 701 is obtained. In the following step 916, the character string obtained in step 914 is set as a constituent element of the file name. At this time, in a case where there is a character string that is already set as a file name, a delimiter is added to the end of the character string that is already set, and then the character string obtained in step 914 is added next to the delimiter. It should be noted that examples of a delimiter include a hyphen "-" and an underscore "_" and the delimiter is not particularly limited. Then in step 917, a character string currently set is displayed (automatically inputted) in the file name input field 701.

The above description is the content of the file name generating process. In the present embodiment, description has been given of an example of a situation of setting a file name by using OCR processing results of the character areas in the scan image. However, the scope of application of the present invention is not limited to the situation of setting a file name. For example, the file name generating process is applicable to data transfer destination settings such as an upload destination of a scan image or destination settings in FAX transmission or email transmission. In this case, for example, in the above-described upload settings screen 800 shown in FIG. 8, OCR processing results of character areas in a scan image may be optionally displayed as candidates for a folder path so that a path name can be set according to user selection. Furthermore, in a destination setting screen (not shown), OCR processing results of character areas in a scan image may be optionally displayed as candidates for a FAX number or email address so that a FAX number or email address can be set according to user selection. In this manner, in a situation other than the file name setting, for example, setting various types of information relating to a scan image (supplementary information), such as setting a data transfer destination or the like, the present invention is widely applicable.

Modification Example

In the above example, priority of zone OCR is different between the inside and the outside of the current preview region (or its peripheral region), but the priority is not limited to this. Irrespective of the current preview region, zone OCR may be performed, for example, in order of top, middle, and bottom parts of a scan image in a normal position.

In a case where an OCR pending list is obtained for the outside of the current preview region (or its peripheral region) (step 907), for example, a scan image may be divided into some sections, and the sections may be targets for which an OCR pending list is obtained in descending order of priority from the highest to the lowest. For instance, in a case where the scan image is obtained by scanning a document in A4-size, landscape, with horizontal writing, the scan image is divided into four sections: upper left, upper right, lower left, and lower right sections. Then, in descending order of possibility that a user selects a character area, information on an OCR pending list is obtained for each one quarter of the entire image. Typically, it is assumed that a possibility of selecting an upper part of the scan image in a normal position is higher than that of selecting a lower part, and therefore, information on an OCR pending list is obtained, for example, in order of upper left, upper right, lower left, and lower right sections. Then, if zone OCR on character areas in a first section is finished, zone OCR is performed on character areas in a second section. In this manner, precisely controlling the order of zone OCR allows a file name and the like to be set more efficiently. It should be noted that the way of dividing a scan image may be manually set or a scan image may be automatically divided by setting in advance the number of divisions according to a size of a document or a direction in which text is written.

According to the present embodiment, by sequentially performing zone OCR, if, at a point when the user selects a desired character area, OCR processing on the character area relating to the selection is already finished, its OCR result may be used to immediately generate a file name and the like. Furthermore, performing zone OCR with respect to the current preview region with a higher priority allows a user to more efficiently set a file name and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a situation of setting a file name and the like by using a character string obtained by performing OCR processing to a scan image, a file name and the like can be immediately set with less calculation resources.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-159543, filed Aug. 22, 2017, which is hereby incorporated by reference wherein in its entirety.

What is claimed is:
1. An apparatus comprising:
a memory storing a program; and
a processor that executes the program to perform:
displaying a scan image on a UI screen, wherein a user can select at least one of character areas included in the displayed scan image;
performing OCR processing to the character areas in order of priority of each such character area, wherein the OCR processing is started before the user selects the at least one of the character areas included in the displayed scan image; and
setting, as supplementary information of the scan image, a result of the OCR processing performed to the at least one of character areas selected by the user, wherein, in a case where the started OCR processing has already been performed to the selected character area when the user selects the selected character area, the result of the already-performed OCR processing is set as the supplementary information, and wherein, in a case where the started OCR processing has not yet been performed to the selected character area when the user selects the selected character area, the processor controls that an OCR processing is immediately performed to the selected character area and a result obtained by the immediately-performed OCR processing to the selected character area is set as the supplementary information.

2. The apparatus according to claim 1, wherein a priority of a character area inside a region displayed in the UI screen is higher than a priority of a character area outside the displayed region.

3. The apparatus according to claim 1, wherein a priority of a character area inside or neighboring the displayed region is higher than a priority of a character area distant from the displayed region.

4. The apparatus according to claim 1, wherein a priority of a character area in an upper part of the displayed region is higher than a priority of a character area in a lower part of the displayed region.

5. The apparatus according to claim 1, wherein, in a case where the started OCR processing has not yet been performed to the selected character area when the user selects the selected character area, the processor controls that the started OCR processing is stopped and an OCR processing is immediately performed to the selected character area and a result obtained by the OCR processing immediately performed to the selected character area is set as the supplementary information.

6. A control method of an apparatus comprising:
displaying a scan image on a UI screen, wherein a user can select at least one of character areas included in the displayed scan image;
performing OCR processing to the character areas in order of priority of each such character area, wherein the OCR processing is started before the user selects the at least one of the character areas included in the displayed scan image; and
setting, as supplementary information of the scan image, a result of the OCR processing performed to the at least one of character areas selected by the user,
wherein, in a case where the started OCR processing has already been performed to the selected character area when the user selects the selected character area, the result of the already-performed OCR processing is set as the supplementary information, and
wherein, in a case where the started OCR processing has not yet been performed to the selected character area when the user selects the selected character area, an OCR processing is immediately performed to the selected character area and a result obtained by the immediately-performed OCR processing to the selected character area is set as the supplementary information.

7. A non-transitory computer readable storage medium storing a program for causing a computer to perform:
displaying a scan image on a UI screen, wherein a user can select at least one of character areas included in the displayed scan image;
performing OCR processing to the character areas in order of priority of each such character area, wherein the OCR processing is started before the user selects the at least one of the character areas included in the displayed scan image; and
setting, as supplementary information of the scan image, a result of the OCR processing performed to the at least one of character areas selected by the user,
wherein, in a case where the started OCR processing has already been performed to the selected character area when the user selects the selected character area, the result of the already-performed OCR processing is set as the supplementary information, and
wherein, in a case where the started OCR processing has not yet been performed to the selected character area when the user selects the selected character area, an OCR processing is immediately performed to the selected character area and a result obtained by the immediately-performed OCR processing to the selected character area is set as the supplementary information.

8. An apparatus comprising:
a memory storing a program; and
a processor that executes the program to perform:
displaying a scan image on a UI screen, wherein a user can select at least one of character areas included in the displayed scan image;
performing OCR processing to the character areas in order of priority of each such character area, wherein the OCR processing is started before the user selects the at least one of the character areas included in the displayed scan image; and
setting, as supplementary information of the scan image, a result of the OCR processing performed to the at least one of character areas selected by the user,
wherein, in a case where the started OCR processing is already performed to the character area selected when the user selects the selected character area, the result of the already-performed OCR processing is set as the supplementary information, and
wherein, in a case where the started OCR processing is not performed to the selected character area when the user selects the selected character area, the processor controls so that the OCR processing is performed to the selected character area and a result obtained by performing the OCR processing to the selected character area is set as the supplementary information.

9. The apparatus according to claim 8, wherein a priority of a character area inside a region displayed in the UI screen is higher than a priority of a character area outside the displayed region.

10. The apparatus according to claim 8, wherein a priority of a character area inside or neighboring the displayed region is higher than a priority of a character area distant from the displayed region.

11. The apparatus according to claim 8, wherein a priority of a character area in an upper part of the displayed region is higher than a priority of a character area in a lower part of the displayed region.

12. A control method comprising:
displaying a scan image on a UI screen, wherein a user can select at least one of character areas included in the displayed scan image;
performing OCR processing to the character areas in order of priority of each such character area, wherein the OCR processing is started before the user selects the at least one of the character areas included in the displayed scan image; and setting, as supplementary information of the scan image, a result of the OCR processing performed to the at least one of character areas selected by the user, wherein, in a case where the started OCR processing is already performed to the character area selected when the user selects the selected character area, the result of the already-performed OCR processing is set as the supplementary information, and wherein, in a case where the started OCR processing is not performed to the selected character area when the user selects the selected character area, the processor controls so that the OCR processing is performed to the selected character area and a result obtained by performing the OCR processing to the selected character area is set as the supplementary information.

13. A non-transitory computer readable storage medium storing a program for causing a computer to perform:

displaying a scan image on a UI screen, wherein a user can select at least one of character areas included in the displayed scan image;

performing OCR processing to the character areas in order of priority of each such character area, wherein the OCR processing is started before the user selects the at least one of the character areas included in the displayed scan image; and setting, as supplementary information of the scan image, a result of the OCR processing performed to the at least one of character areas selected by the user, wherein, in a case where the started OCR processing is already performed to the character area selected when the user selects the selected character area, the result of the already-performed OCR processing is set as the supplementary information, and wherein, in a case where the started OCR processing is not performed to the selected character area when the user selects the selected character area, the processor controls so that the OCR processing is performed to the selected character area and a result obtained by performing the OCR processing to the selected character area is set as the supplementary information.

* * * * *